United States Patent [19]

Bentjens et al.

[11] Patent Number: 5,368,418
[45] Date of Patent: Nov. 29, 1994

[54] INDEXABLE CUTTING INSERT

[75] Inventors: Bernd Bentjens, Schwarzenbek; Klaus Oppelt, Lauenburg, both of Germany

[73] Assignee: Wilhelm Fette GmbH, Schwarzenbek, Germany

[21] Appl. No.: 50,967

[22] Filed: Apr. 21, 1993

[30] Foreign Application Priority Data

Apr. 23, 1992 [DE] Germany ............... 4213284

[51] Int. Cl.⁵ .................. B23C 5/20; B23C 5/04
[52] U.S. Cl. ......................... 407/114; 407/42
[58] Field of Search ............... 407/42, 113, 114

[56] References Cited

U.S. PATENT DOCUMENTS

| | | | |
|---|---|---|---|
| 2,212,012 | 8/1940 | Davidson | 407/113 |
| 3,434,190 | 3/1969 | Kaiser | 407/113 |
| 3,781,956 | 1/1974 | Jones et al. | |
| 4,214,846 | 7/1980 | Kraemer | 407/114 |
| 4,659,264 | 4/1987 | Friedline | 407/113 |
| 4,971,483 | 11/1990 | Kress et al. | 407/114 |
| 5,067,858 | 11/1991 | Cook | 407/114 |

FOREIGN PATENT DOCUMENTS

| | | |
|---|---|---|
| 0035848A3 | 2/1981 | European Pat. Off. . |
| 0298285A1 | 1/1989 | European Pat. Off. . |
| 392730 | 12/1989 | European Pat. Off. . |
| 392729 | 10/1990 | European Pat. Off. . |
| 0416901A2 | 3/1991 | European Pat. Off. . |
| 2276892 | 1/1976 | France . |
| 2258448 | 8/1973 | Germany . |
| 2103967 | 3/1983 | United Kingdom ............... 407/114 |

*Primary Examiner*—William E. Terrell
*Attorney, Agent, or Firm*—Vidas, Arrett & Steinkraus

[57] ABSTRACT

A peripheral indexable cutting insert for mounting to a tool holder under an axial mounting angle (a) other than zero. The insert is formed from a sintered body having a longitudinal central axis and a generally trapezoid cross-section and has a substantially planar mounting face, a substantially planar front face opposite said mounting face and opposing side faces formed therebetween. At least a pair of opposite cutting edges having diagonally opposed leading and trailing ends are formed on the insert. Each cutting edge is formed at the intersection of a chip surface with an adjacent clearance surface. Each chip surface is formed on the front face adjacent a side face, and each clearance surface is formed on a side face adjacent the front face. The chip surfaces are formed by respective linear grooves shaped in the front face. Each groove extends under an acute angle (b) opening from the leading towards the training end of its associated cutting edge with respect to the longitudinal central axis of the body and each groove has a depth continuously increasing from the trailing towards the leading end of its associated cutting edge and is provided with a substantially constant cross-sectional radius of curvature throughout its length. The angle of each chip surface permanently changes from the trailing end towards the leading end, so that, when mounted to a holder under a predetermined axial mounting angle (a), the effective chip angle with respect to a workpiece from the leading towards the trailing end is substantially constant.

6 Claims, 2 Drawing Sheets

INDEXABLE CUTTING INSERT

BACKGROUND OF THE INVENTION

The present invention relates to a peripheral indexable cutting insert for mounting to a tool holder under an axial angle different from zero, said insert being made of a trapezoid body and comprising a substantially planar mounting face, a substantially plane front face opposite said mounting face and side faces formed therebetween as well as at least a pair of opposite cutting edges each including a respective chip face and an adjacent clearance face, wherein the chip faces each are formed by a hollow groove shaped in the front face and the clearance faces each are formed by one of said side faces.

Peripheral indexing cutting inserts are known since long. They generally comprise a prismatic body including a planar mounting face and at least a cutting edge corresponding to the intersection line between a chip face and a clearance face along the side face of the indexable insert. The insert is secured to a tool holder such that the cutting edge performs a circle when the tool head is rotated. Typically, the insert is located under an angle with respect to the rotational axis (axial angle). This axial angle directly affects the tool life parameter and the life time of the cutting edge. A smooth cutting operation results from a relatively large axial angle.

For an axial angle different from zero and for a straight cutting edge, an accurate 90°-angle can not be milled since the leading end and the lagging end of the cutting edge are not located on a common cylindrical face. Furthermore, the chip angle and clearance angle as well as the sign of the chip angle may change across the length of the cutting edge which can be detrimental for a high quality performance. However, certain angles have to be selected to obtain an optimum lifetime and to facilitate the chip removal, which angles can not be maintained across the length of the cutting edge in view of what has been discussed above. From this follows that cutting tools of the indexable insert type are not used for a peripheral finishing operation. Rather, cutting tools having helical cutting edges have been used heretobefore to fulfill the needs required. Cutting tools of this type, however, are relatively expensive when being provided with removable cutters.

EP 0 392 729 and 0 392 730 disclose peripheral indexable cutting inserts tending to avoid the drawbacks of conventional inserts. The cutting edge is curved, i.e. as an intersection line of a plane section through a cylinder. The angle of the section plane corresponds to the axial angle. This ensures that the cutting edge lies on a cylindrical face and that the tool is suited to provide an accurate angle of 90°.

According to a further feature of the prior art cutting tool, the chip face and the clearance face are continuously curved such that a constant chip angle or, respectively a constant clearance angle result therefrom along the cutting edge.

The advantage of the prior art tool is seen in the fact that a relatively large axial angle can be selected. Furthermore, the chip angle as well as the clearance angle can be optimized for a positive cutting geometry. However, there is a drawback that the known inserts are formed without cutting, in particular by a sintering process which itself is not particularly expensive. However, the sintering process leads to allowances not permissible, in particular the so-called concentricity is objected too. Furthermore, each different insert geometry requires a separate forming tool, even when the chip angle or the clearance angle only are slightly changed. From this follows that there is a need for a higher number of forming tools. A further drawback is encountered as sintered inserts can not be subjected to a coating process according to the PVD-method. Coating processes of this type to surface-harden the tool mostly require a preceeding grinding operation of the tool which desired inserts do not allow.

SUMMARY OF THE INVENTION

It is an object of the present invention to provide an indexable cutting insert which is easy to manufacture, and which yields a similarly high quality performance as a finishing cutting tool.

According to the invention the object is solved by providing a peripheral indexable cutting insert for mounting to a tool holder under an axial angle different from zero, said insert being made of a trapezoid body and comprising a substantially planar mounting face, a substantially plane front face opposite said mounting face and side faces formed therebetween as well as at least a pair of opposite cutting edges each including a respective chip face and an adjacent clearance face, wherein the chip faces each are formed by a hollow groove shaped in the front face and the clearance faces each are formed by one of said side faces, characterized in that the straight hollow groove (28, 30) extends under an acute angle (b) opening from the leading towards the lagging end of the body with respect to the longitudinal central axis (32) of the body, that the hollow groove has a depth continuously increasing from the lagging towards the leading end of the body and that the hollow groove is provided with a substantially constant cross sectional radius of curvature (R1) throughout its length.

DETAILED DESCRIPTION OF THE INVENTION

Figure 1:
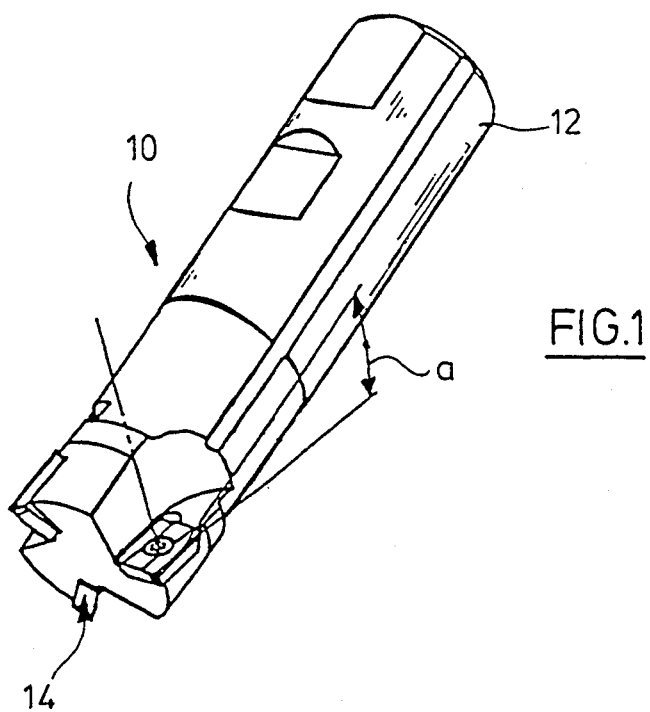
FIG. 1 is a perspective view of a cutting tool comprising three indexable inserts according to the invention.

The indexable insert according to the invention can be made from a trapezoidal preworked, preferable surface ground sintered blank. As for conventional tools the blank has a plane mounting face and a substantially plane front face opposite the mounting face, wherein it is important that the surface areas adjacent the cutting edges are plane, while the shape of the surface in the center region is not substantial.

The invention is based on the recognition that results are obtained similar to known indexable inserts having curved chip and clearance faces, provided the chip face is formed by means of a preferably straight hollow groove in the front face, said groove having an acute angle with respect to the longitudinal central axis of the body, said angle opening from the leading towards to the lagging end and said groove having a depth continuously increasing from the lagging towards the leading end. This hollow groove can be easily made by a simple grinding step. By selecting the grinding parameters, the chip angle at the ends of the cutting edge can thus be voluntarily determined such that the same values are obtained for a predetermined axial angle at the leading end and the lagging end of the cutting edge, for example. It should be understood that the chip angle between the ends can not be exactly identical. For this a "twist" of the chip face would be required as known from the prior art discussed above. The shaping of the indexable insert within the cutting edge region thus approximates the geometrical relations of the known indexable insert which does not exhibit more drawbacks, but offers a number of advantages. Accordingly, it is easily possible to grind desired chip angles in predetermined blanks, i.e. fitting the chip angles to certain tooling requirements. Based on a predetermined fixing in the grinding machine the grinding parameters only can be changed which can be made without encountering any problems. The manufacturing process further results in an improved running concentricity which can not be obtained with sintered inserts. The indexable cutting insert thus allows to obtain a precision which could be obtained here to before with finishing tools only (without indexable inserts). Furthermore, the insert according to the invention may be coated by using a particularly advanced coating process which can be performed at low temperatures for which the tool has to be ground as mentioned above.

The angle at which the hollow groove extends towards the cutting edge (of the blank) is typically a function of the chip angle desired wherein the inclination correlates with the slope of the hollow groove and, if desired, with the radius of the grinding tool producing the hollow groove. For a predetermined radius, the grinding depth determines the inclination of the chip face, wherein attention must be paid to the fact that the hollow groove directly joins the cutting edge under the desired chip angle. However, it is not difficult to determine the parameters for processing the hollow groove. It should be understood that the increase in depth of the hollow groove is not constantly varied. However, there is an advantage in working when the increase in depth is substantially constant.

When a chip angle is desired which is constant across the length of the cutting edge, the inclination of the chip face at the leading end and lagging end of the cutting edge may be selected such that for a predetermined axial angle these angles include the same value as above mentioned. The chip angles between both the ends then include only slightly varying values.

To produce an accurate 90°-angle, the prior art discussed above provides a cutting edge which extends along the peripheral surface of a cylinder, defined by a section line of a plane section through the cylinder in accordance with the axial angle. From this results an elliptical curvature of the cutting edge which can be theoretically produced by means of a grinding machine as well. The invention, however, is based on the recognition that this expenditure is not necessary, on the contrary, it is sufficient when the cutting edge receives a certain crowning which is principally disclosed in FR-A-2276892. According to an aspect of the invention this crowning can be obtained by a convex grinding of the section of the flank (clearance face) adjacent the cutting edge. Preferably, the flanking face is ground in an arcuate circle having a relatively large radius. It has been determined that faces produced by this type of cutting edge sufficiently approximate an ideal 90°-angle. The grinding process allows to correct the clearance angle throughout the cutting length at will, eliminating the need for additional expenditure.

Summarizing, it can be said that a high accuracy of concentricity as well as a plane running is obtained by means of the indexable cutting insert according to the invention and that highly accurate 90°-surfaces can be obtained. Furthermore, the insert according to the invention makes a large axial angle possible, resulting in a smooth cut and an excellent chip removal.

The foregoing and other objects, features and advantages of the present invention will become apparent in the light of the following detailed description of an exemplary embodiment thereof, as illustrated in the accompaning drawings.

FIG. 1 shows a cutting tool 10 comprising a substantially cylindrical holder 12 and three indexable cutting inserts 14 which are conventionally mounted in the holder under an axial angle a.

Figure 2:
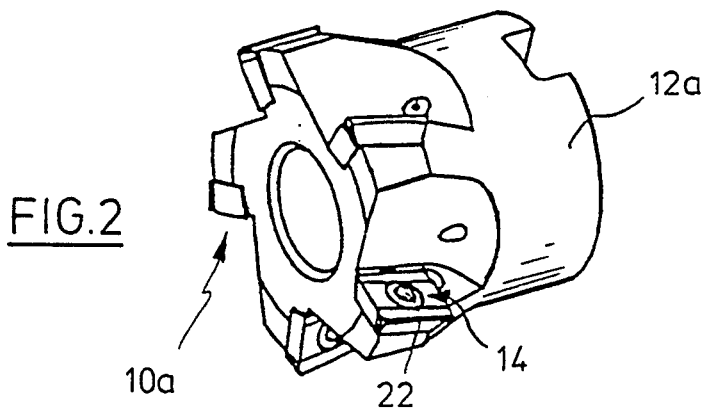
FIG. 2 is a perspective view of a cutting head similar to FIG. 1 in an enlarged scale.
Figure 3:
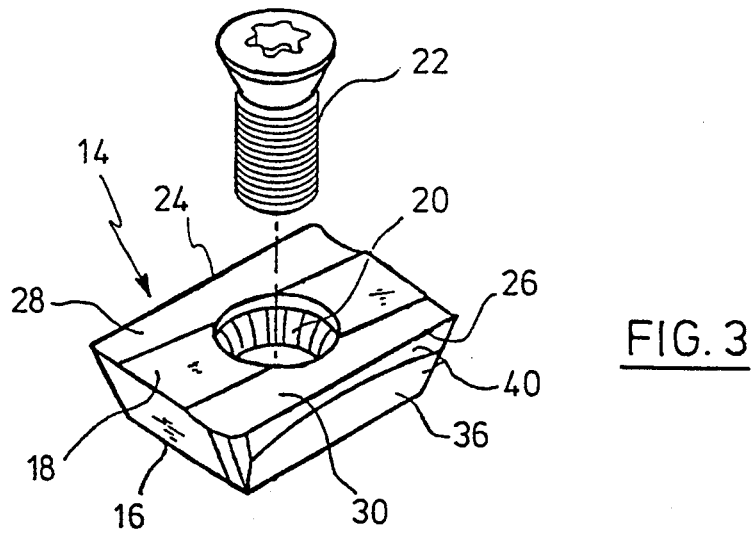
FIG. 3 is a perspective view of an indexable cutting insert of the cutting tools according to FIGS. 1 and 2.

FIG. 2 shows a similar cutting tool 10a comprising five cutting inserts 14 of the type shown in FIG. 1. The structure of the tool holder 12 or 12a and the mounting of the cutting inserts 14 is not described in detail as this is conventional.

The cutting inserts 14 are made of a trapezoid sintered blank. The insert has a plane ground mounting face 16 and a plane front face 18 lying parallel to the mounting face 16. The insert 14 is further provided with a central cylindrical opening 20 for receiving a mounting screw 22 to secure the insert 14 to the tool holder 10 or 10a.

Figure 7:
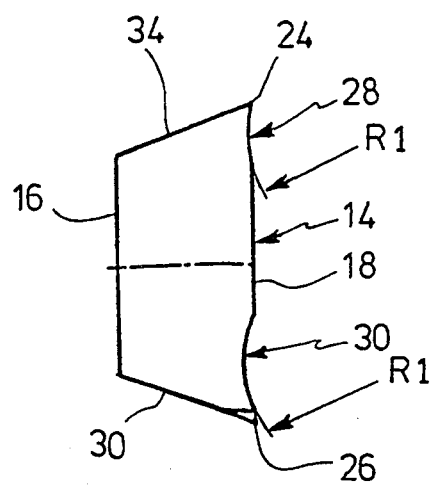
FIG. 7 is a side view of the cutting insert of FIG. 4 seen in the direction of arrow 7.

The cutting insert 14 further includes cutting edges 24, 26 located on opposite side faces. The cutting edges are formed by the adjacent faces of a hollow groove 28 and 30 formed in the front face 18, as well as by a relief or clearance face 40. The hollow grooves extend under an angle b with respect to the cutting edge 24, 26 or with respect to the axis 32 of the cutting insert. The hollow grooves 28, 30 are made by a grinding tool from which results that there is a constant radius R1 of the cross section of the groove throughout its length. Due to the inclined angle and the varying depths of the hollow grooves 28, 30, a varying wedge angle for the side face 24, 36 of the insert 14 results. As FIG. 7 particularly shows, the one end of the groove has a maximum depth which is continuously reduced towards the other end. The hollow grooves 28, 30 are located mirror-inverted so that both cutting edges 24, 26 can be used one after the other in indexing the insert.

For a predetermined radius R1 of the grinding tool and the selected depth of the hollow grooves 28, 30 a chip face is produced which inclination is continuously varied throughout the length of the cutting edge 24, 26. In the mounted position of the cutting insert 14, the end of the cutting edge including the deeper groove is located at the leading end, whereas the flat groove section is located at the lagging end. Accordingly, one obtains an approximately constant chip angle throughout the length of the cutting edge 24, 26 for a predetermined axial angle and a preselected angle at the leading and the lagging end.

Figure 4:
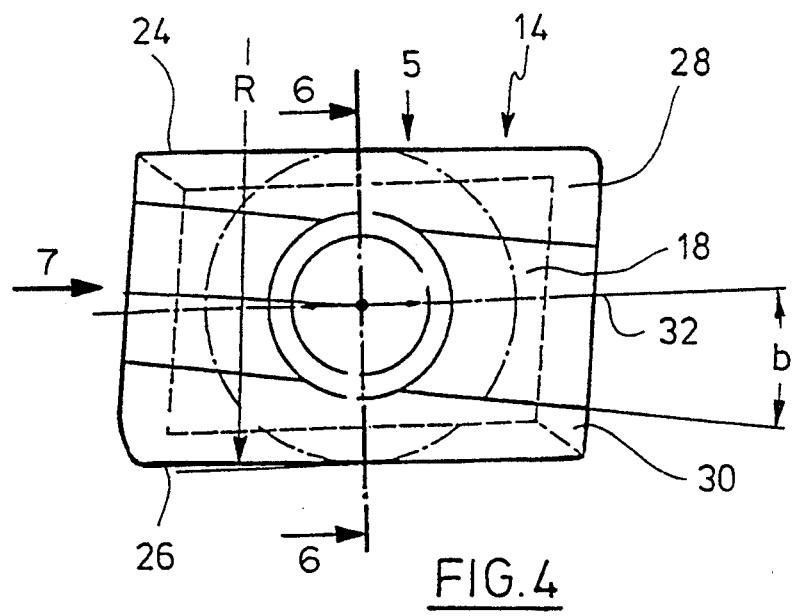
FIG. 4 is a plane view of the cutting insert of FIG. 3.
Figure 5:
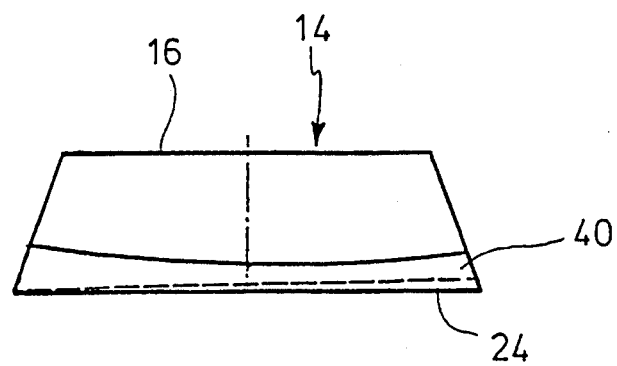
FIG. 5 is a side view of the cutting insert of FIG. 4 as seen in the direction of arrow 5.
Figure 6:
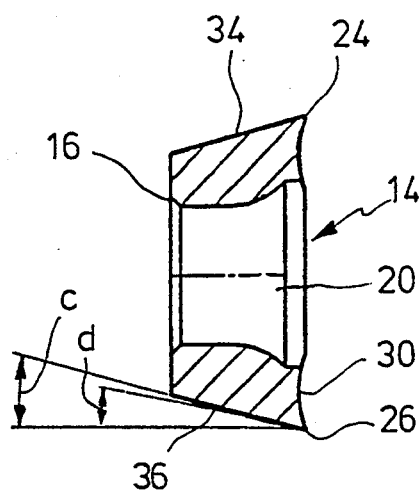
FIG. 6 is a section through the cutting insert of FIG. 4 along line 6—6.

As FIGS. 3 to 7 further show, the portion 40 adjacent the cutting edge 24, 26 is ground in a convex configuration. This grinding step which can be performed in the same machine using the same mounting as in grinding the plane surfaces 34 and 36, is made in using a relatively large radius R (FIG. 4). This results in a slightly convex curved cutting edge 24, 26 in the plane of the front face 18 of the cutting insert 14 and further results in a clearance face 40 including a continuous change of the clearance angle b in the same mounting (the clearance angle of the plane faces 34, 36 is designated "c" in FIG. 6). The convex curvature allows to obtain a sufficiently precise 90°-face disregarding the fact that the cutting edge 24, 26 is not highly precisely, but rather approximately located on a cylindrical surface.

As mentioned before, the grinding of the curved faces is performed in one and the same mounting after grinding the surfaces 34, 36. After grinding the cutting insert 14 can be coated with a proper material by means of conventional coating methods to increase the surface strength.

What is claimed is:

1. A peripheral indexable cutting insert for mounting to a tool holder under axial mounting angle (a) different from zero, said insert comprising a body having a longitudinal central axis and a generally trapezoid cross-section, the body comprising a substantially planar mounting face, a substantially planar front face opposite said mounting face and opposing side faces formed therebetween, at least a pair of opposite cutting edges having diagonally opposed leading and trailing ends, each cutting edge formed at the intersection of a chip surface with an adjacent clearance surface, each chip surface formed on the front face adjacent a side face, and each clearance surface formed on a side face adjacent said front face, the chip surfaces being formed by respective linear grooves shaped in the front face, each said groove extending under an acute angle (b) opening from the leading towards the training end of its associated cutting edge with respect to the longitudinal central axis of the body, each groove having a depth continuously increasing from the trailing towards the leading end of its associated cutting edge and provided with a substantially constant cross-sectional radius of curvature throughout its length, the angle of each said chip surface continuously changing from the trailing towards the leading end, whereby, when mounted to a holder under a predetermined said axial mounting angle (a), the effective chip angle with respect to a workpiece from the leading towards the trailing end is substantially constant.

2. The cutting insert of claim 1, wherein the grooves extend under an angle of 5° to 10° with respect to the longitudinal axis of the body.

3. The cutting insert of claim 1 wherein the depth of the grooves increases approximately constantly.

4. The cutting insert of claim 1, wherein the clearance surfaces are ground in a curved configuration such that the cutting edge is slightly convex in the plane of the front face.

5. The cutting insert of claim 4 wherein the curved clearance surfaces are arcuately ground using a relatively large radius (R) in the plane of the front face.

6. The cutting insert of claim 1 wherein the body is formed from a sintered trapezoidal blank which has been surface ground so that the mounting and front faces are in parallel planes.

* * * * *